S. HOUGH AND S. BAADER.
GREASE CUP.
APPLICATION FILED MAY 26, 1919.
1,327,238.
Patented Jan. 6, 1920.
2 SHEETS—SHEET 1.
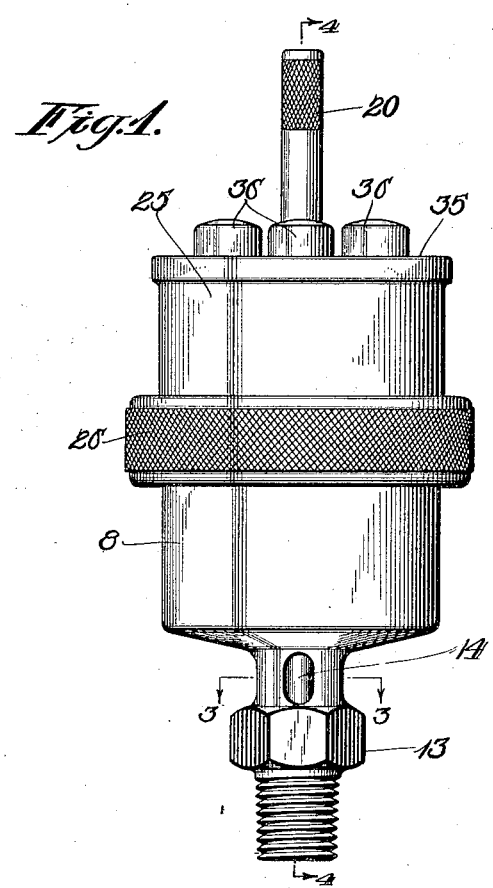
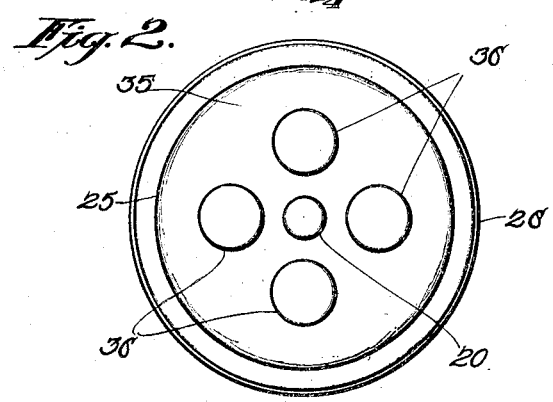
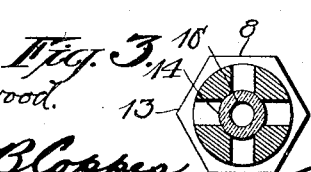
Inventors
Samuel Hough.
and Stephan Baader.

S. HOUGH AND S. BAADER.
GREASE CUP.
APPLICATION FILED MAY 26, 1919.
1,327,238.
Patented Jan. 6, 1920.
2 SHEETS—SHEET 2.
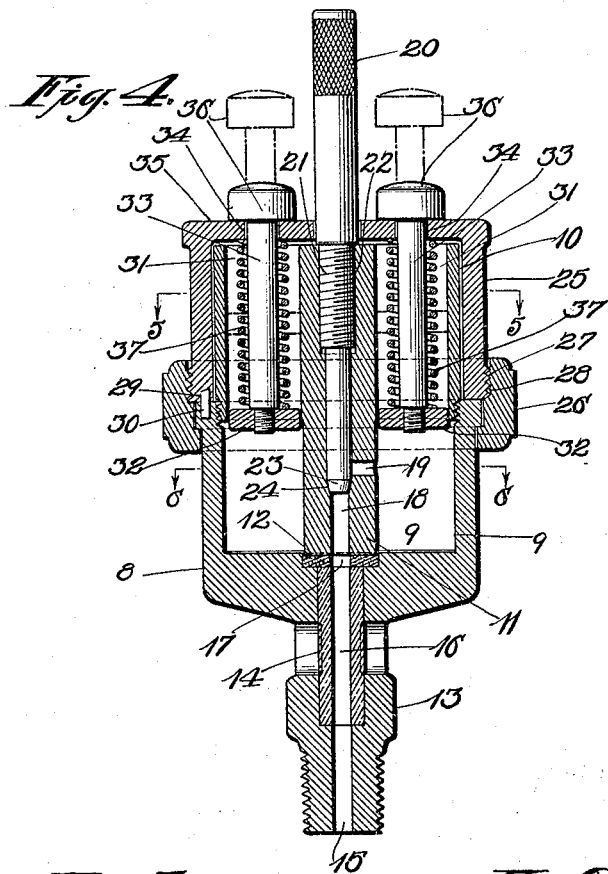
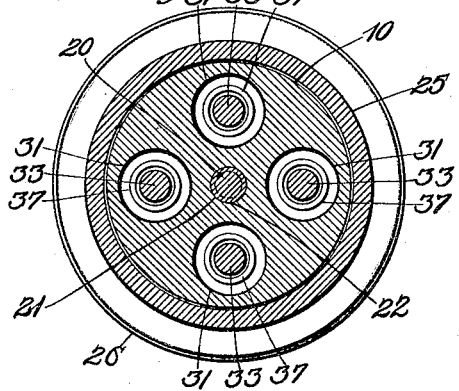
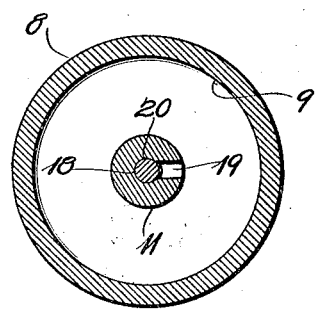
Witnesses
Horace C. Harwood.
Augustus B. Coppes
Inventors
Samuel Hough.
and Stephan Baader.
By Joshua R. H. Potts
Their Attorney

UNITED STATES PATENT OFFICE.

SAMUEL HOUGH, OF ATCO, NEW JERSEY, AND STEPHAN BAADER, OF PHILADELPHIA, PENNSYLVANIA.

GREASE-CUP.

1,327,238.

Specification of Letters Patent.

Patented Jan. 6, 1920.

Application filed May 26, 1919. Serial No. 299,780.

*To all whom it may concern:*

Be it known that we, SAMUEL HOUGH and STEPHAN BAADER, citizens of the United States, residing at Atco, county of Camden, and State of New Jersey, and Philadelphia, county of Philadelphia, and State of Pennsylvania, have invented certain new and useful Improvements in Grease-Cups, of which the following is a specification.

One object of our invention is to provide a self-feeding grease cup which can be readily attached to machinery of all types for lubricating purposes and which will be so constructed that the grease will be fed from a well in such manner as to supply comparatively cool grease through an outlet passage.

Another object is to provide means of a simple construction which will regulate the quantity of grease passing out of the outlet passage.

A still further object is to mount a sight glass in such manner that the supply of grease can be easily observed and at the same time permit the glass to be easily inserted or removed and firmly held in place while in its operative position.

Another object is to make our invention of a simple and durable construction and so that it can be easily made.

These objects, and other advantageous ends which will be described hereinafter, we attain in the following manner, reference being had to the accompanying drawings in which—

Figure 1 is an elevation of our improved grease cup,

Fig. 2 is a top plan view of Fig. 1,

Fig. 3 is a section taken on the line 3—3 of Fig. 1,

Fig. 4 is a central vertical section taken on the line 4—4 of Fig. 1,

Fig. 5 is a transverse section taken on the line 5—5 of Fig. 4, and

Fig. 6 is a transverse section taken on the line 6—6 of Fig. 4.

Referring to the drawings, 8 represents a cup section which is preferably made of metal and has a cylindrical bore 9 which provides a grease well. The section 8 is internally screw threaded adjacent its top edges, and a casing 10 has its lower portion externally screw threaded and fitting the internal screw threads of the section 9. The casing 10 includes a stem 11 which rests upon a washer or gasket 12 which is set in the bottom surface of the well 9. The cup section 8 has a depending shank 13 into which is fitted a sight glass 14 in the form of a tube. An outlet passage 15 is formed centrally in the shank 13 and in alinement with the passage 16 of the sight glass tube 14 and also in alinement with the hole 17 in the gasket 12. The stem 11 has a passage 18 in registry with the hole 17 in the gasket 12, and a port 19 in the stem 11 communicates with the passage 18 and with the well 9. The port 19 is positioned above the bottom of the well, as clearly shown in Fig. 4 and for a purpose hereinafter to be described.

A valve rod 20 has a screw threaded portion 21 which fits a tapped hole 22 in the casing 10, and the lower end of the valve rod is made tapered as shown at 23 and is adapted to engage a valve seat 24 formed in the passage 18; said valve seat being positioned below the port 19.

A hollow cap 25 abuts the top edge of the cup section 8 and forms a closure for the casing 10. A coupling ring or nut 26 abuts an annular shoulder on the cup section 8 and has internal screw threads 27 which engage external screw threads 28 on the cap 25 so as to firmly secure the cap and the cup section together. The lower edge of the cap 25 is preferably provided with a notch 29 for registry with a pin 30 so that the cup section 8 and cap 25 are prevented from relative rotation after they have once been put together.

The casing 10 has a plurality of cylindrical chambers 31 in which slidably fit pistons 32; said pistons being connected to rods 33. The rods 33 freely slide through holes 34 in the top 35 of the cap 25 and these rods 33 are provided with heads 36 which limit the downward movement of the pistons 32 within the chambers 31. Each of the piston rods 33 is surrounded by a coiled spring 37, said spring at its upper end engaging the inner surface of the top 35 of the cap 25, and the lower ends of the springs respectively engage the upper surfaces of the pistons.

In the use of our improved grease cup, the well 9 and chambers 31 are filled with grease and the cap 25 is then applied with the pistons 32 respectively entering the tops of the chambers 31. The coupling ring 26 is then attached to secure the cap 25 to the cup section 8. The valve rod 20 is then turned until the end 23 moves off the valve seat and permits the grease to pass through the port 19, passage 18, hole 17, sight glass tube 14 and finally through the outlet passage 15. It will be noted that the springs 37 serve to move the pistons 32 downwardly and thus apply pressure to the grease so as to force the latter through the port 19.

By having the port 19 above the bottom of the well 9, the grease passing through the port 19 will be comparatively cool, since, when the grease cup is placed upon engines or other machinery which are hot, the lower portion of the grease cup will become comparatively hot. With the above described construction, the pistons 32 force the grease toward the bottom of the well and the reaction is such that the upper or cooler portion of the grease will pass through the port 19. It will be further noted that the stem 11 serves as a firm holding means to secure the sight glass in position, and when the casing 10 is removed it is possible to lift the sight glass out through the well 9 of the cup section 8. Also, by turning the valve rod 20, the port 19 can be partially cut off, or as illustrated in Fig. 4, can be entirely cut off when desired.

While we have described our invention as taking a particular form, it will be understood that the various parts of our invention may be changed without departing from the spirit thereof, and hence we do not limit ourselves to the precise construction set forth, but consider that we are at liberty to make such changes and alterations as fairly come within the scope of the appended claims.

Having thus described our invention, what we claim as new and desire to secure by Letters Patent is:

1. A grease cup including a section providing a well and having an outlet passage; a casing having a chamber communicating with said well and a portion having a passage communicating with said outlet passage, said portion including a port communicating with said well and with the passage in said portion; a valve for cutting off said port to said well passage; and means operative within said chamber to compress grease within said well and force it through said port; substantially as described.

2. A grease cup including a base section having a well and an outlet passage; a casing having a chamber in communication with said well; means operative in said chamber to compress the grease in said well; a stem on said casing and having a passage communicating with said outlet passage, said stem having a port communicating with the passage therein and with the well; and a sight glass tube in said first section and in registry with the outlet passage and with the passage in said stem, said stem serving as retaining means for holding the sight glass tube within said section; substantially as described.

3. A grease cup including a section providing a well and having an outlet passage; a casing having chambers communicating with said well and a portion having a passage communicating with said outlet passage, said portion including a port communicating with said well and with the passage in said portion; a valve for cutting off said port to said well passage; and pistons operative within said chambers to compress grease within said well and force it through said port; substantially as described.

4. A grease cup including a section providing a well and having an outlet passage; a casing having chambers communicating with said well and a portion having a passage communicating with said outlet passage, said portion including a port communicating with said well and with the passage in said portion; a valve for cutting off said port to said well passage; a cap secured to said first section; rods slidable through said cap and into said chambers; and pistons secured to said rods and operative within said chambers, whereby the grease is forced out of said chambers into the passage and through said port; substantially as described.

5. A grease cup including a section providing a well and having an outlet passage; a casing having chambers communicating with said well and a portion having a passage communicating with said outlet passage, said portion including a port communicating with said well and with the passage in said portion; a valve for cutting off said port to said well passage; a cap secured to said first section; rods slidable through said cap and into said chambers; pistons secured to said rods and operative within said chambers; and coiled springs operative to move said pistons to force the grease out of said chambers into said well and through said port; substantially as described.

6. A grease cup including a base section having a well and an outlet passage; a casing having chambers in communication with said well; pistons operative within said chambers; and a stem depending from said casing and having a passage communicating with said outlet passage, said stem having a port positioned above the bottom of said well and communicating with the passage in said stem and with the well; substantially as described.

7. A grease cup including a base section having a well and an outlet passage; a casing having chambers in communication with said well; pistons operative within said chambers; a stem depending from said casing and having a passage communicating with said outlet passage, said stem having a port positioned above the bottom of said well and communicating with the passage in said stem and with the well; and a sight glass tube in said first section and in registry with the outlet passage and with the passage in said stem, said stem serving as retaining means for holding the sight glass tube within said section; substantially as described.

In testimony whereof we have signed our names to this specification in the presence of two subscribing witnesses.

SAMUEL HOUGH.
STEPHAN BAADER.

Witnesses:
 CHAS. E. POTTS,
 ANNA RENTON.